United States Patent
Shoji

(10) Patent No.: US 11,901,621 B2
(45) Date of Patent: Feb. 13, 2024

(54) COMMUNICATION APPARATUS AND COMMUNICATION SYSTEM

(71) Applicant: CANON KABUSHIKI KAISHA, Tokyo (JP)

(72) Inventor: Yuki Shoji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 16/808,156

(22) Filed: Mar. 3, 2020

(65) Prior Publication Data
US 2020/0203823 A1  Jun. 25, 2020

Related U.S. Application Data

(63) Continuation of application No. PCT/JP2018/032163, filed on Aug. 30, 2018.

(30) Foreign Application Priority Data

Sep. 7, 2017  (JP) ................. 2017-171726

(51) Int. Cl.
*H01Q 1/52* (2006.01)
*H02J 50/10* (2016.01)
(Continued)

(52) U.S. Cl.
CPC ............. *H01Q 1/52* (2013.01); *H02J 50/10* (2016.02); *H02J 50/40* (2016.02); *H04B 5/0037* (2013.01)

(58) Field of Classification Search
CPC ... H01Q 1/52; H01Q 1/44; H02J 50/10; H02J 50/40; H02J 13/00022; H02J 50/80;
(Continued)

(56) References Cited

U.S. PATENT DOCUMENTS

2010/0330851 A1* 12/2010 Costello .............. H01R 12/712
                                                                 439/884
2013/0049481 A1*  2/2013 Kudo ..................... H02J 50/12
                                                                 307/104
(Continued)

FOREIGN PATENT DOCUMENTS

CN          103094995 A        5/2013
CN          103812228 A        5/2014
(Continued)

*Primary Examiner* — Thai Pham
(74) *Attorney, Agent, or Firm* — Canon U.S.A., Inc. IP Division

(57) ABSTRACT

A communication apparatus includes a power transmission coil and a power transmission circuit that performs wireless power transmission to another communication apparatus at a predetermined power transmission frequency via the power transmission coil. The other communication apparatus includes a power reception coil coupled to the power transmission coil with at least either of an electric field or a magnetic field. In addition, the communication apparatus includes a receiving antenna and a receiving circuit that receives via the receiving antenna a signal transmitted from the other communication apparatus via a transmitting antenna of the other communication apparatus. Furthermore, the communication apparatus includes a filter circuit that suppresses a signal of the power transmission frequency, which is to be input from the receiving antenna to the receiving circuit due to the wireless power transmission by the power transmission circuit.

6 Claims, 6 Drawing Sheets

(51) Int. Cl.
*H02J 50/40* (2016.01)
*H04B 5/00* (2006.01)

(58) Field of Classification Search
CPC ...... H04B 5/0037; H04B 5/0081; H04B 5/02; H04B 5/00; Y02E 60/00; Y04S 40/121; Y04S 40/126; H01P 5/02
See application file for complete search history.

(56) References Cited

U.S. PATENT DOCUMENTS

| | | | |
|---|---|---|---|
| 2014/0125141 A1 | 5/2014 | Shinohe | |
| 2016/0006293 A1* | 1/2016 | Jeong | G06F 1/1626 320/108 |
| 2016/0031332 A1* | 2/2016 | Garcia Briz | H02J 50/402 320/108 |
| 2016/0327444 A1* | 11/2016 | Ichikawa | H01F 38/18 |
| 2016/0380365 A1* | 12/2016 | Helbers | H04B 5/02 455/73 |
| 2017/0271927 A1* | 9/2017 | Sakata | H04B 5/02 |

FOREIGN PATENT DOCUMENTS

| | | |
|---|---|---|
| CN | 103947081 A | 7/2014 |
| CN | 105207687 A | 12/2015 |
| CN | 106233559 A | 12/2016 |
| IN | 106663965 A | 5/2017 |
| JP | 2005-228981 A | 8/2005 |
| JP | 2009-268022 A | 11/2009 |
| JP | 2011-228933 A | 11/2011 |
| JP | 2013-46561 A | 3/2013 |
| JP | 2013-115932 A | 6/2013 |
| JP | 2014-96612 A | 5/2014 |
| JP | 2015100232 A | 5/2015 |
| JP | 2015170936 A | 9/2015 |
| JP | 2016-72810 A | 5/2016 |
| KR | 2013-0054807 A | 5/2013 |

* cited by examiner

COMMUNICATION APPARATUS AND COMMUNICATION SYSTEM

CROSS-REFERENCE TO RELATED APPLICATIONS

This application is a Continuation of International Patent Application No. PCT/JP2018/032163, filed Aug. 30, 2018, which claims the benefit of Japanese Patent Application No. 2017-171726, filed Sep. 7, 2017, both of which are hereby incorporated by reference herein in their entirety.

TECHNICAL FIELD

The present invention relates to an apparatus that performs wireless power transmission and communication.

BACKGROUND ART

In recent years, many devices are provided with rotating movable portions that are capable of transmitting signals in order to meet the need for movability and control of the devices. Such devices are exemplified by, for example, a high-end portion of a robot, a connecting portion of the platform of a network camera, and a connector of a mobile device.

Technologies have hitherto been proposed, which wirelessly transmit signals in the rotating movable portions of such devices. Communications through near-field electromagnetic field coupling, such as the ones in Japanese Patent Laid-Open No. 2016-72810 and Japanese Patent Laid-Open No. 2011-228933, have been proposed as wireless signal transmission methods capable of realizing high transmission rates and low delay performance.

If not only wireless signal transmission but also wireless power transmission are enabled in the rotating movable portions of the devices, it is possible to completely omit cables and flexible substrates (hereinafter referred to as "cables and so on"). If the rotating movable portions of the devices are completely wirelessly realized, it is possible not only to prevent degradation of the cables and so on but also to avoid the need to connect the cables and so on in small and narrow portions in manufacturing to facilitate the manufacturing.

However, when an antenna for signal transmission and an antenna for power transmission are closely arranged to perform non-contact signal transmission and power transmission through the near-field electromagnetic field coupling, interference may occur from the antenna used for the power transmission to the antenna used for the signal transmission. There is a problem in that the quality of the signal transmission is degraded due to the interference.

In order to resolve the above problem, it is an object of the present invention to provide a communication apparatus that is capable of suppressing the interference of the power transmission with the signal transmission to improve the communication quality of the non-contact signal transmission when the non-contact signal transmission and the non-contact power transmission are performed in proximity.

SUMMARY OF INVENTION

In order to resolve the above problem, a communication apparatus according to the present invention includes a power transmission coil; a power transmission circuit that performs wireless power transmission to another communication apparatus at a predetermined power transmission frequency via the power transmission coil, the other communication apparatus including a power reception coil coupled to the power transmission coil with at least either of an electric field or a magnetic field; a receiving antenna; a receiving circuit that receives via the receiving antenna a signal transmitted from the other communication apparatus via a transmitting antenna of the other communication apparatus; and a filter circuit that suppresses a signal of the power transmission frequency, which is to be input from the receiving antenna to the receiving circuit due to the wireless power transmission by the power transmission circuit.

Further features of the present invention will become apparent from the following description of exemplary embodiments with reference to the attached drawings.

DESCRIPTION OF EMBODIMENTS

A communication apparatus 100 according to one embodiment of the present invention will herein be described. The present embodiment relates to the communication apparatus 100 in which wireless power transmission and wireless communication can be concurrently performed at positions close to each other.

In the present embodiment, a coiled conductor is used as a power transmission antenna that performs the wireless power transmission. This medium is hereinafter referred to as a "coil" (for particular distinction, a coil at a power transmission side is called a "power transmission coil" and a coil at a power reception side is called a "power reception coil"). In contrast, couplers in which an electrode pattern is formed on a printed circuit board are used as communication antennas (a transmitting antenna and a receiving antenna) that perform the communication. A component in which a medium performing the wireless power transmission is integrated with a medium performing the communication is hereinafter referred to as an "antenna". Here, the "communication" means transmission and reception of a signal for controlling a device, information acquired by the device, and/or information indicating the state of the device. The "power transmission" means wireless transmission of power from the power transmission coil to the power reception coil to supply the power to a device to be controlled and/or a device that performs the communication.

In addition, in the present embodiment, the frequency used for the power transmission is referred to as a "power transmission frequency" and the frequency used for the communication is referred to as a "communication frequency". The communication by the communication apparatus 100 is not limitedly performed using a communication method involving modulation and demodulation of carrier waves having the communication frequency and may be performed using a baseband method that does not involve the modulation and demodulation of the carrier waves. In the present embodiment, the communication frequency in the baseband method indicates an average frequency of signals that are transmitted.

Figure 1:
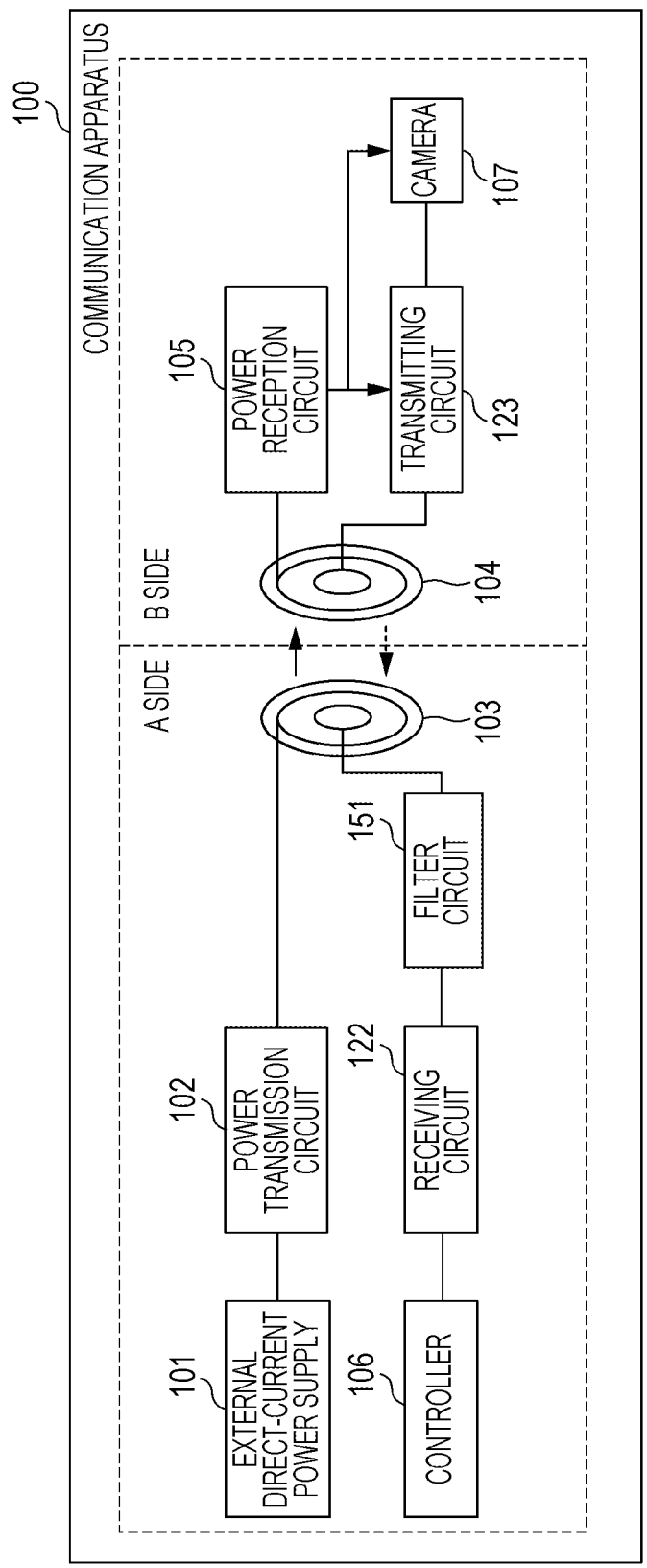
FIG. 1 is a configuration diagram illustrating the configuration of a communication apparatus according to one embodiment of the present invention.

FIG. 1 is a configuration diagram illustrating the configuration of the communication apparatus 100 according to the present embodiment. All the components described below are not necessarily essential.

A case will be exemplified in the following description, in which power is wirelessly transmitted from the A side to the B side in FIG. 1 (in the direction of a solid-line arrow in FIG. 1) in the power transmission. A case will be mainly described below in which a signal is transmitted from the B side to the A side (in the direction of a broken-line arrow in FIG. 1) in the wireless communication, although bidirectional communication between the A side and the B side is available. An example is illustrated in FIG. 1, in which both the components at the power transmission side (at the A side) and the components at the power reception side (at the B side) are included in the single communication apparatus 100. However, the arrangement of the components is not limited to the above one. The power transmission side may be separated from the power reception side or a power-transmission-side communication apparatus and a power-reception-side communication apparatus, which are configured as separated apparatuses, may compose a communication system.

For example, when the communication apparatus 100 is mounted in a network camera in which an imaging unit rotates with respect to the platform, the power is supplied from the components at the A side, which exist in the platform, to the components at the B side, which exist in the imaging unit, and information, such as image data captured by the imaging unit, is transmitted from the B side to the A side.

Reference numeral 101 denotes an external direct-current power supply, which is a power source for the wireless power transmission. Reference numeral 102 denotes a power transmission circuit that performs switching of the power supplied from the external direct-current power supply 101 and converts the power into alternating current (AC current). Reference numerals 103 and 104 denote an antenna at the transmission side of the power transmission and an antenna at the reception side of the power transmission, respectively. Although each of the antennas 103 and 104 includes a power transmission-reception coil and a coupler, this will be described below again. Reference numeral 105 denotes a power reception circuit that rectifies the power transmitted from the antenna 103 to the antenna 104 and outputs the rectified power. Reference numeral 107 denotes a device controlled with the transmitted signal and denotes a camera in the present embodiment. Reference numeral 123 denotes a transmitting circuit that receives video data captured by the camera 107 or accepts an input of a state signal of the camera and transmits the video data or the state signal through signal transmission. The power output from the power reception circuit 105 is supplied to the camera 107 and the transmitting circuit 123 and is used for the operations of the camera 107 and the transmitting circuit 123.

Reference numeral 122 denotes a receiving circuit that receives a signal transmitted from the transmitting circuit 123. Since the case is described in the present embodiment in which the antenna 104 is at the transmission side of the signal and the antenna 103 is at the reception side of the signal, the transmitting circuit and the receiving circuit are positioned at the antenna 104 side and at the antenna 103 side, respectively. However, when the signal transmission is performed in the opposite direction, the transmitting circuit is replaced with the receiving circuit. In this case, the position of a filter circuit 151 is also changed. When the bidirectional communication is performed between the antenna 104 and the antenna 103, both the transmitting circuit and the receiving circuit may be provided at each of the A side and the B side of the communication apparatus 100. In this case, the filter circuit 151 may exist at either of the A side and the B side or the filter circuits 151 may exist at both the A side and the B side.

The filter circuit 151 is provided between the antenna 103 and the receiving circuit 122. The filter circuit 151 includes a filter that reduces the influence of the wireless power transmission on the wireless communication. Reference numeral 106 denotes a controller in the platform.

Figure 2A:
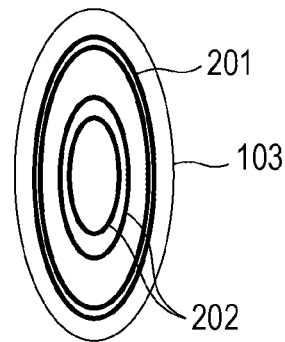
FIG. 2A is an explanatory diagram schematically illustrating the structure of an antenna according to one embodiment of the present invention.
Figure 2B:
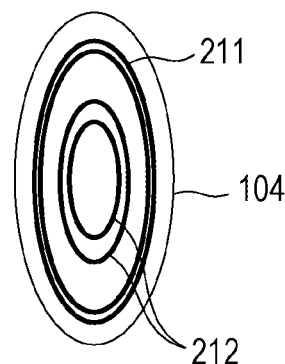
FIG. 2B is an explanatory diagram schematically illustrating the structure of an antenna according to the embodiment of the present invention.
Figure 2C:
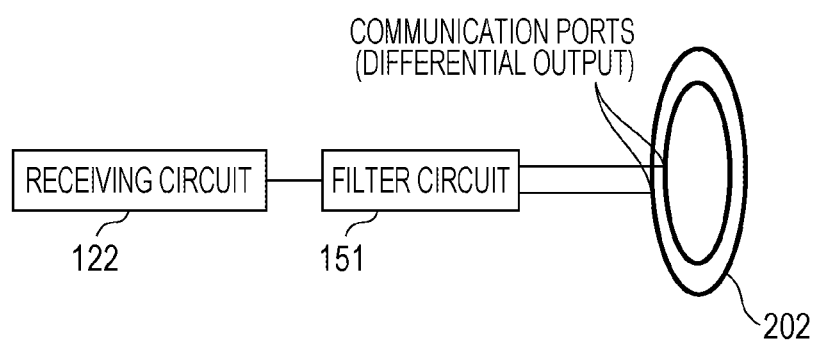
FIG. 2C is an explanatory diagram schematically illustrating how the coupler, the filter circuit, and the receiving circuit are connected according to the embodiment of the present invention.

FIG. 2A, FIG. 2B, and FIG. 2C are explanatory diagrams schematically illustrating the structures of the antennas and how the coupler, the filter circuit, and the receiving circuit are connected.

As illustrated in FIG. 2A and FIG. 2B, the antenna 103 includes a power transmission coil 201 and a reception-side coupler 202. The power transmission coil 201 and the reception-side coupler 202 are concentrically arranged. The antenna 104 includes a power reception coil 211 and a transmission-side coupler 212. The power reception coil 211 and the transmission-side coupler 212 are also concentrically arranged. The power transmission coil 201 and the power reception coil 211 are closely provided so as to be opposed to each other, and the reception-side coupler 202 and the transmission-side coupler 212 are closely provided so as to be opposed to each other. Flowing of alternating-current power at the power transmission coil 201 side causes the power to be transmitted to the power reception coil 211.

The reception-side coupler 202 and the transmission-side coupler 212 are provided so as to be sufficiently close to each other to achieve the communication based on electric field coupling, magnetic field coupling, or electromagnetic field coupling. The spacing between the reception-side coupler 202 and the transmission-side coupler 212 may be, for example, 1 mm or less.

FIG. 2C illustrates how the coupler, the filter circuit, and the receiving circuit are connected. The communication of the present embodiment is performed using differential digital signals. The coupler has impedance and performs input-output using a differential method. The reception-side coupler 202 is connected to the filter circuit 151 so as to achieve the communication using the differential method. Accordingly, the reception-side coupler 202 has two communication ports, as illustrated in FIG. 2C. The two communication ports compose transmission paths of a positive signal and a negative signal composing differential signals. The filter circuit 151 is provided on the transmission paths between the reception-side coupler 202 and the receiving circuit 122. The transmission-side coupler 212 is connected to the transmitting circuit 123 via two communication ports for the differential communication, as in the above case. However, the communication between the transmission side and the reception side may be performed using a single-end method, instead of the differential method. In this case, each coupler may have one communication port.

It is sufficient for the communication apparatus 100 of the present embodiment to have at least the power reception coil 211 and the power transmission coil 201 as the components for the wireless power transmission. In other words, external devices may be used as the external direct-current power supply 101 and the power transmission circuit 102 and the alternating current may be directly supplied to the power transmission coil 201.

In addition, it is sufficient for the communication apparatus 100 of the present embodiment to have at least the transmitting circuit 123, the transmission-side coupler 212, the reception-side coupler 202, the filter circuit 151, and the receiving circuit 122 as the components for the wireless signal transmission.

Figure 3:
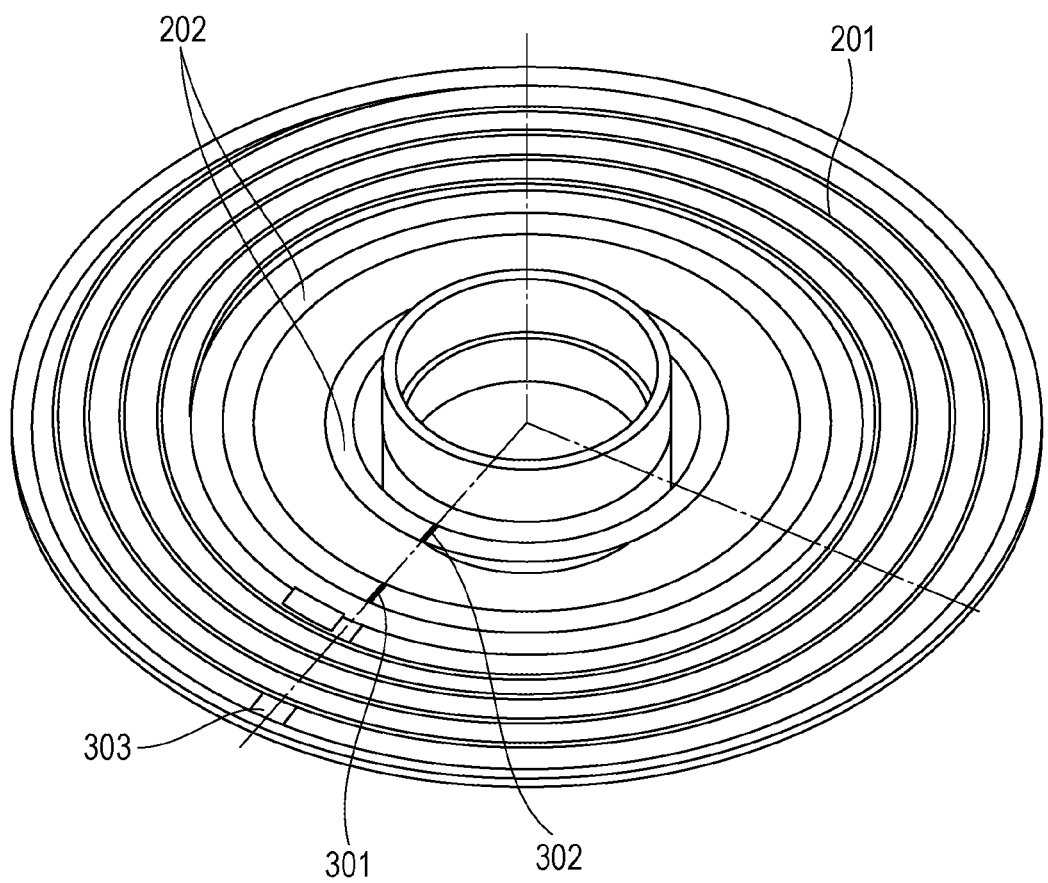
FIG. 3 is a perspective view illustrating the positions of ports of an antenna according to one embodiment of the present invention.

FIG. 3 is a perspective view illustrating the positions of ports of the antenna 103 according to the present embodiment. The antenna 104 has a similar configuration. The power reception coil 211 is provided in the same manner as in the power transmission coil 201 in FIG. 3 and the transmission-side coupler 212 is provided in the same manner as in the reception-side coupler 202 in FIG. 3. The substrate composing the antenna 103 and the substrate composing the antenna 104 are closely arranged so as to be opposed to each other and at least either of the substrates may be rotatable with a driver (not illustrated) of the communication apparatus 100.

As illustrated in FIG. 3, in the present embodiment, the power transmission coil 201 and the reception-side coupler 202 are concentrically arranged on the same substrate. In the present embodiment, the reception-side coupler 202 has two communication ports: a communication port 301 and a communication port 302, as illustrated in FIG. 3, in order to transmit the differential digital signals. The power transmission coil 201 has one power transmission port 303.

With the above configuration, the communication apparatus 100 of the present embodiment operates in the following manner. Direct-current power is supplied from the external direct-current power supply 101 to the power transmission circuit 102, the direct-current power is converted into AC current through the switching in the power transmission circuit 102, and the AC current is supplied to the power transmission coil 201 of the antenna 103. The frequency of the switching is the power transmission frequency. Flowing of the alternating current through the power transmission coil 201 causes the alternating current to be generated in the power reception coil 211, that is, causes the power to be transmitted from the power transmission coil 201 to the power reception coil 211, and the power is supplied to the power reception circuit 105. The alternating current is converted into direct current of required voltage in the power reception circuit 105 and the direct current is supplied to the transmitting circuit 123 and the camera 107 to be used as the power source of the operations of these devices.

The camera 107 performs imaging, outputs image data that is acquired and the state signal of the camera (for example, the state signal indicating the state of panning, tilting, and zooming (PTZ) of the camera), and supplies the image data and the state signal to the transmitting circuit 123. The transmitting circuit 123 converts the input signal into the differential digital signals and supplies the differential digital signals to the transmission-side coupler 212.

Since the reception-side coupler 202 is coupled to the transmission-side coupler 212 with the electric field, the magnetic field, or the electromagnetic field, the signal input into the transmission-side coupler 212 is transmitted to the reception-side coupler 202. At this time, since the power transmission coil 201 and the power reception coil 211 are provided so as to be close to the reception-side coupler 202 and the transmission-side coupler 212, respectively, and the amplitude of the transmission waveform of the power is varied greater than the amplitude of the transmission waveform of the communication signal, noise caused by the power transmission may be mixed into the signal transmitted to the reception-side coupler 202. Accordingly, the communication apparatus 100 includes the filter circuit 151 for suppressing the noise. Since the noise mainly exists around the power transmission frequency in the conversion of the direct current into the alternating current for the power transmission, the filter circuit 151 is configured so as to reduce signals of a band near the power transmission frequency. The signal subjected to the noise reduction is supplied from the filter circuit 151 to the receiving circuit 122, and the receiving circuit 122 detects at least an edge signal of the differential digital signals. The receiving circuit 122 further includes a comparator, which rectifies and demodulates the detected signal. The noise of frequencies other than the power transmission frequency may be further reduced by setting a threshold value of the current or the voltage in the comparator. The signal demodulated by the receiving circuit 122 is supplied to the controller 106 to be used for certain data processing.

When a control signal is supplied from the controller 106 to the camera 107 to control the camera 107, the signal is sequentially supplied from the controller 106 to the transmitting circuit, the couplers, the receiving circuit, and the camera. At this time, the receiving circuit 122 and the transmitting circuit 123 function as the transmitting circuit and the receiving circuit, respectively, as described above. In this case, the filter circuit 151 is preferably provided between the receiving circuit and the coupler at the camera side, which receives the signal.

The advantages of the filter when the filter circuit 151 includes a high pass filter will now be described with reference to FIG. 4A and FIG. 4B.

Figure 4A:
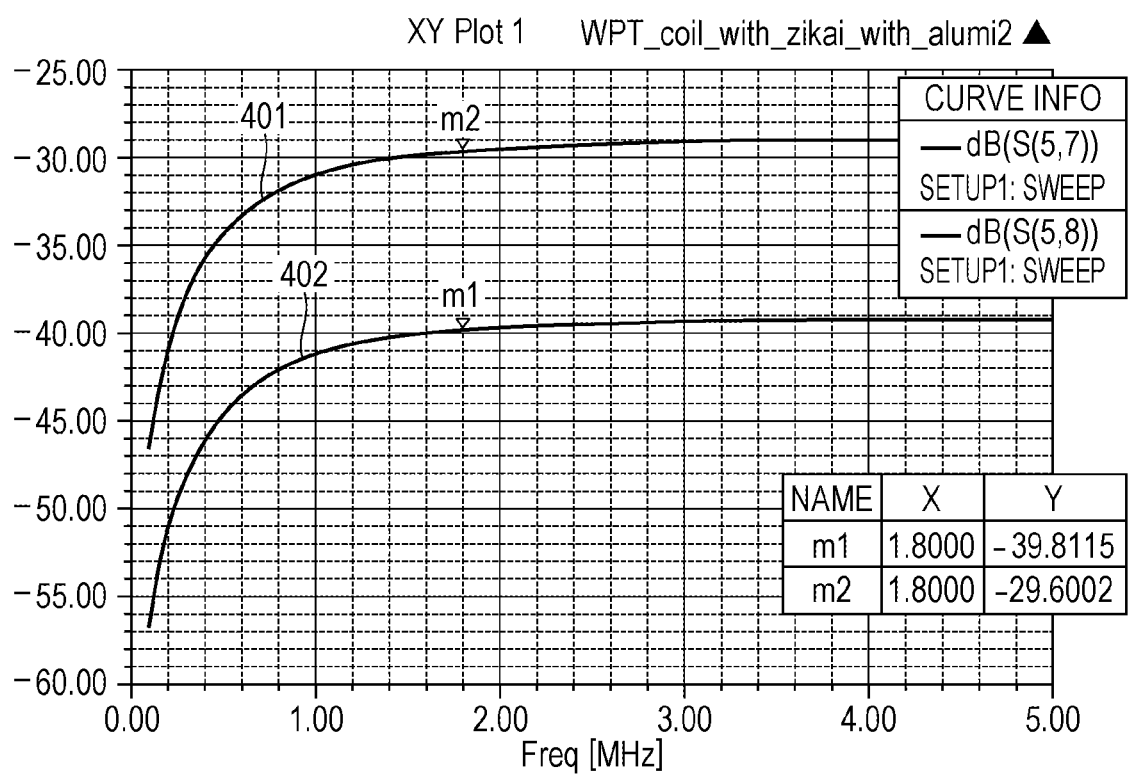
FIG. 4A is a graph indicating a result of simulation of the attenuation of interference owing to a high pass filter.
Figure 4B:
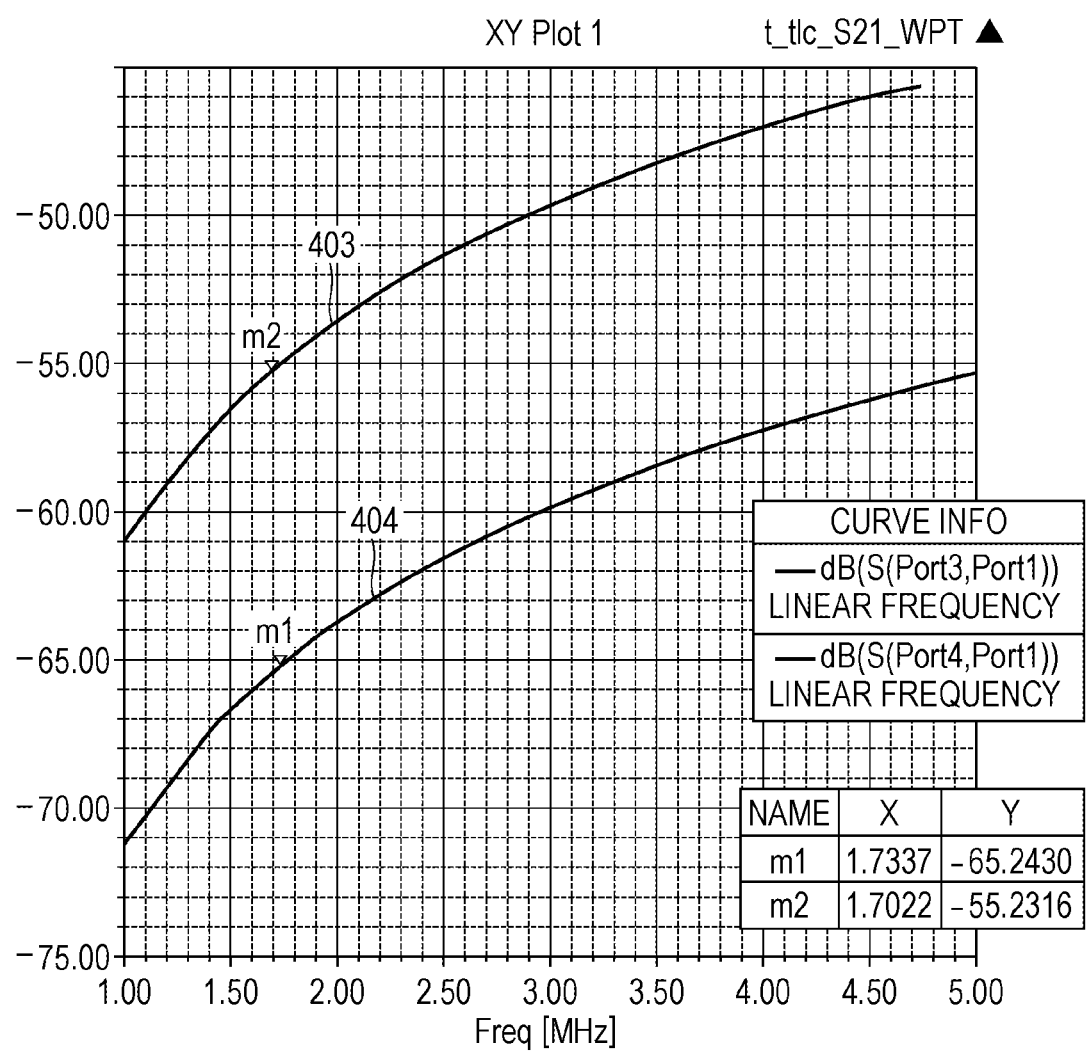
FIG. 4B is a graph indicating a result of simulation of the attenuation of the interference owing to the high pass filter.

FIG. 4A and FIG. 4B indicate results of simulation of the attenuation of interference owing to the high pass filter. In FIG. 4A and FIG. 4B, the vertical axis represents the degree of interference from the power transmission port 303 to each communication port. FIG. 4A and FIG. 4B indicate that the influence of the power transmission on the signal transmission is reduced with the decreasing value of the degree of interference. The horizontal axis represents the communication frequency.

FIG. 4A is a graph when the filter circuit 151 is not mounted in the communication apparatus 100 and FIG. 4B is a graph when the filter circuit 151 is mounted in the communication apparatus 100. It is assumed that the power transmission frequency is 1.8 MHz and the high pass filter cutting off the power transmission frequency is used. It is assumed that the power transmission port 303, the communication port 301, and the communication port 302 are arranged in the manner illustrated in FIG. 3. Reference numerals 401 and 403 indicate the degrees of interference from the power transmission port 303 to the communication port 301 and reference numerals 402 and 404 indicate the degrees of interference from the power transmission port 303 to the communication port 302.

As illustrated in FIG. 4A, when the filter circuit 151 is not mounted, at the communication frequency of 1.8 MHz, the degree of interference from the power transmission port 303 to the communication port 301 was about −29 dB and the degree of interference from the power transmission port 303 to the communication port 302 was about −39 dB.

As illustrated in FIG. 4B, when the filter circuit 151 is mounted, at the communication frequency of 1.8 MHz, the degree of interference from the power transmission port 303 to the communication port 301 was about −55 dB and the degree of interference from the power transmission port 303 to the communication port 302 was about −65 dB.

From the above results, the degree of interference is advantageously improved by about 26 dB for each communication port owing to the filter circuit 151.

The filtering method of the filter circuit 151 is not limited to the high pass filter described above.

Figure 5A:
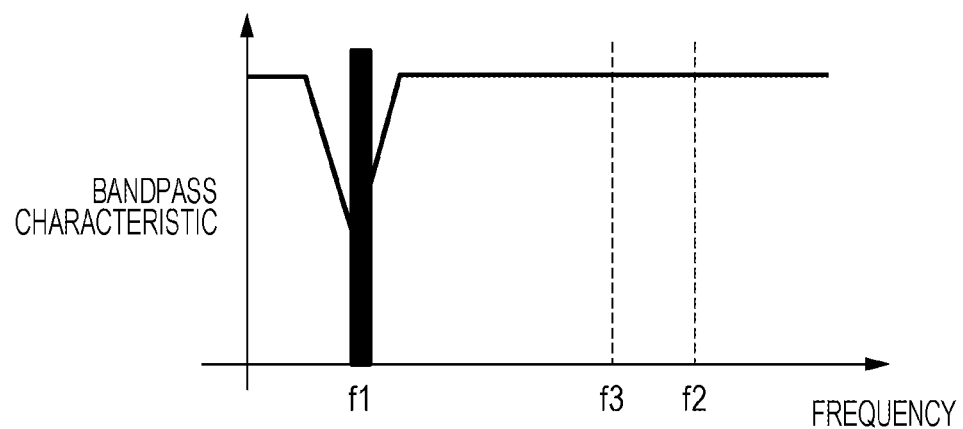
FIG. 5A is a graph indicating a filtering method and a characteristic.
Figure 5B:
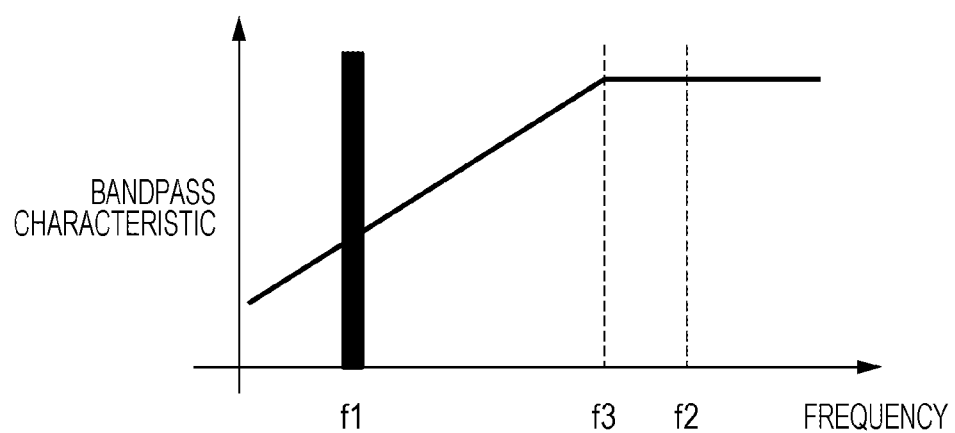
FIG. 5B is a graph indicating a filtering method and a characteristic.

FIG. 5A and FIG. 5B are graphs indicating the filtering methods and characteristics.

FIG. 5A illustrates a characteristic of a notch filter. The vertical axis represents a bandpass characteristic and the horizontal axis represents the frequency.

Reference numeral and letter f1 denotes the power transmission frequency caused by the switching in the power transmission circuit 102 and reference numeral and letter f2 denotes the communication frequency at which a signal is transmitted. Reference numeral and letter f3 denotes a cutoff frequency of the high pass filter for comparison with FIG. 5B. It is assumed that the power transmission frequency f1 is 1.8 MHz.

The notch filter is a filter that cuts off only signals of a certain frequency. A notch filter that transmits the signals of the communication frequency f2 and cuts off or at least suppresses the signals of the power transmission frequency f1 is used as the notch filter of the present embodiment. In other words, the characteristics of the filter is adjusted so as to attenuate only the signals of the power transmission frequency f1, among the signals of the frequency f1 and the signals of the frequency f2.

As illustrated in FIG. 5A, provision of such a notch filter between the reception-side coupler 202 of the antenna 103 and the receiving circuit 122 enables the influence of the wireless power transmission on the wireless communication to be reduced.

The power transmission circuit 102 may vary the switching frequency. In other words, the communication apparatus 100 may be capable of switching the power transmission frequency at which the wireless power transmission is performed, among multiple predetermined power transmission frequencies. In this case, it is possible to suppress the interference of the signals even if the power transmission frequency is varied by configuring the communication apparatus 100 so that the filter characteristics of the filter circuit 151 are appropriately changed in accordance with the switching of the power transmission frequency.

FIG. 5B illustrates a method of reducing the influence of the wireless power transmission on the wireless communication with the high pass filter and the filter characteristic.

As in FIG. 5A, the vertical axis represents the bandpass characteristic and the horizontal axis represents the frequency. Reference numeral and letter f1 denotes the power transmission frequency caused by the switching in the power transmission circuit 102, reference numeral and letter f2 denotes the communication frequency at which a signal is transmitted, and reference numeral and letter f3 denotes the cutoff frequency of the filter.

The high pass filter transmits signals of frequencies higher than or equal to the cutoff frequency. In the present embodiment, the high pass filter is used, the cutoff frequency f3 of which is higher than the power transmission frequency f1 and is lower than the communication frequency f2.

As illustrated in FIG. 5B, the use of such a high pass filter enables sharp attenuation characteristics that have sufficiently small loss of the signal at the communication frequency f2 and that have large loss at the power transmission frequency f1 to be achieved.

As described above, the use of the high pass filter, instead of the notch filter, enables the influence of the wireless power transmission on the wireless communication to be reduced.

The transmitting circuit 123 may modulate the signals of multiple kinds at different frequencies to concurrently transmit the signals, and the receiving circuit 122 may receive the signals of the multiple frequencies to demodulate the respective signals at the respective frequencies.

In addition, instead of the method of transmitting the signals of the multiple kinds at different frequencies, serial-parallel converting means and parallel-serial converting means may be used. In this case, the parallel-serial converting circuit is provided upstream of the transmitting circuit 123 of the signals and the serial-parallel converting circuit is provided downstream of the receiving circuit 122.

In this case, the signals of the multiple kinds are input into the parallel-serial converting circuit before being input into the transmitting circuit 123 and are converted into a serial signal by the parallel-serial converting circuit. The signal converted into the serial signal is transmitted between the transmission-side coupler 212 and the reception-side coupler 202 in the state of the serial signal. Since the noise of the power transmission is also mixed into the serial signal transmitted to the reception side, the noise is reduced by the filter circuit 151 and, then, the serial signal is input into the receiving circuit 122. The receiving circuit 122 rectifies and demodulates the serial signal and supplies the signal to the serial-parallel converting circuit. The serial-parallel converting circuit converts the serial signal into the original signals of the multiple kinds for subsequent processing.

Although the example is described above in which the communication apparatus 100 is mounted in a network camera, the communication apparatus 100 is not limitedly mounted in a network camera. The communication apparatus 100 is applicable to, for example, a robot hand, a rotating radar mounted on a ship or the like, a propeller for wind power generation. For example, when the communication apparatus 100 is applied to a robot hand, the components at the A side (at the power transmission side) in FIG. 1 are arranged in the arm of the robot and the components at the B side (at the power reception side) are arranged in the hand (holder) of the robot. In addition, the antenna that performs the communication and the power transmission is not limitedly arranged in the rotating portion of a device and may be arranged in a slidable portion or a fixed portion that is not movable. Furthermore, the components at the A side and the components at the B side of the communication apparatus 100 illustrated in FIG. 1 may be mounted in separate independent devices to compose a communication system including the multiple devices that perform the power transmission and the communication.

Although the antennas 103 and 104 are exemplified by the rotatable circular antennas, the antennas may have any shape, such as a circular shape, a rectangular shape, a three-dimensional cylindrical shape, a cubic shape, or a parallel shape. Although the coils are used as the media for the power transmission in the above description, the media for the power transmission are not limited to the coils. For example, the wireless power transmission may be performed through the electric field coupling using electrodes, instead of the coils. Alternatively, the wireless power transmission may be performed through the electromagnetic field coupling.

In addition, although the case is described in the present embodiment in which the coil and the coupler are concentrically arranged, the advantages are capable of being achieved with other arrangement. For example, the same advantages are capable of being achieved even when the coil and the coupler are arranged in parallel to each other. In addition, as for the arrangement of the coil and the coupler, the advantages of the present embodiment are capable of being achieved even when the coupler is arranged on the outside of the coil or even when the coil and the coupler are provided at random.

Furthermore, when the antenna is composed of a substrate, the material, the quality of material, the thickness of the substrate, the outer diameter, the thickness of the patterns, the interval between the patterns, and so on may be arbitrarily determined. The antenna may be realized by a component other than the substrate. For example, the antenna may be composed of lead wire or Litz wire that is wound.

The wireless power transmission method is not limited. For example, an electromagnetic induction method or a magnetic field resonance method may be used as the wireless power transmission method. Although the communication method using the electric field coupling, the magnetic field coupling, or the electromagnetic field coupling is used as the wireless communication method in the present embodiment, the wireless communication method is not limited to the above ones. For example, a Wi-Fi (registered trademark) communication method or a Bluetooth (registered trademark) communication method may be used. The same advantages are capable of being achieved in these cases.

Although the signal for the communication is described as a binary digital signal, the signal for the communication is not limited to the binary signal and may be a multi-valued signal.

According to the present embodiment, the influence of the power transmission on the signal transmission is capable of being suppressed when the power and the signal is concurrently wirelessly transmitted via the small antennas. Accordingly, it is possible to completely wirelessly realize, for example, the rotating movable portions of various devices to realize the simply structured devices that are easily manufactured.

Aspects of the present invention are not limited the embodiments described above and various additions, modifications, and partial deletions are available without departing from the conceptual thought and idea of the present invention.

According to the present invention, it is possible to suppress the interference of wireless power transmission with wireless signal transmission to improve the communication quality of near-field signal transmission when non-contact signal transmission and non-contact power transmission are performed in proximity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication system comprising:
a first communication apparatus; and
a second communication apparatus,
wherein the first communication apparatus includes a first coil, and a first antenna for transmission, and
wherein the second communication apparatus includes
a second coil coupled to the first coil of the first communication apparatus using at least one of an electric field or a magnetic field,
a power transmission circuit that performs wireless power transmission to the first communication apparatus at a predetermined power transmission frequency via the second coil,
a second antenna for reception,
a receiving circuit that receives via the second antenna differential signals transmitted from the first communication apparatus via the first antenna, and
a high-pass filter circuit that prevents a noise which is caused by the wireless power transmission from entering the receiving circuit from the second antenna, and
wherein the second antenna includes an electrode configured to detect one of the differential signals transmitted from the first communication apparatus and an electrode configured to detect an other of the differential signals transmitted from the first communication apparatus.

2. The communication system according to claim 1,
wherein the first coil and the first antenna are concentrically composed on a first substrate, and
wherein the second coil and the second antenna are concentrically composed on a second substrate opposed to the first substrate.

3. The communication system according to claim 2, comprising:
rotation controlling means for rotating at least either of the first substrate and the second substrate.

4. The communication system according to claim 1,
wherein the first communication apparatus and the second communication apparatus are included in different portions in a network camera or a robot hand.

5. The communication system according to claim 1,
wherein the receiving circuit receives via the second antenna, a signal transmitted from the communication apparatus via the first antenna using a baseband method.

6. A communication system comprising:
a first communication apparatus; and
a second communication apparatus,
wherein the first communication apparatus includes a first coil, and a first antenna for reception, and
wherein the second communication apparatus includes
a second coil coupled to the first coil of the first communication apparatus using at least one of an electric field or a magnetic field,
a power transmission circuit that performs wireless power transmission to the first communication apparatus at a predetermined power transmission frequency via the second coil, and
a second antenna for transmission, and
wherein the first communication apparatus includes,
a receiving circuit that receives via the first antenna differential signals transmitted from the second communication apparatus via the second antenna, and a high-pass filter circuit that prevents a noise which is caused by the wireless power transmission from entering the receiving circuit from the first antenna, and wherein the first antenna includes an electrode configured to detect one of the differential signals transmitted from the second communication apparatus and an electrode configured to detect an other of the differential signals transmitted from the second communication apparatus.

\* \* \* \* \*